May 25, 1943.   E. L. BLACK   2,319,787
SIGHT TRAINING PICTURE DEVICE
Filed June 1, 1942
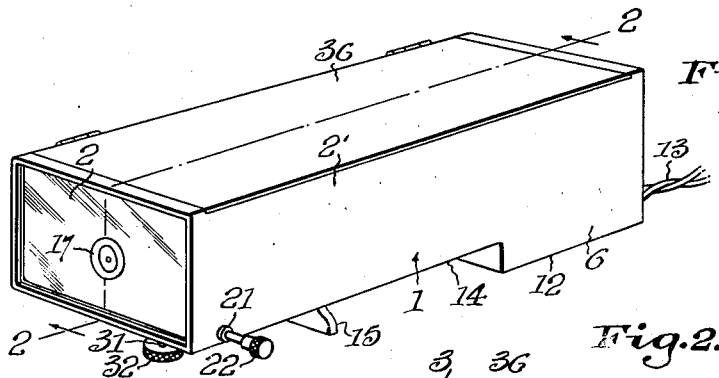
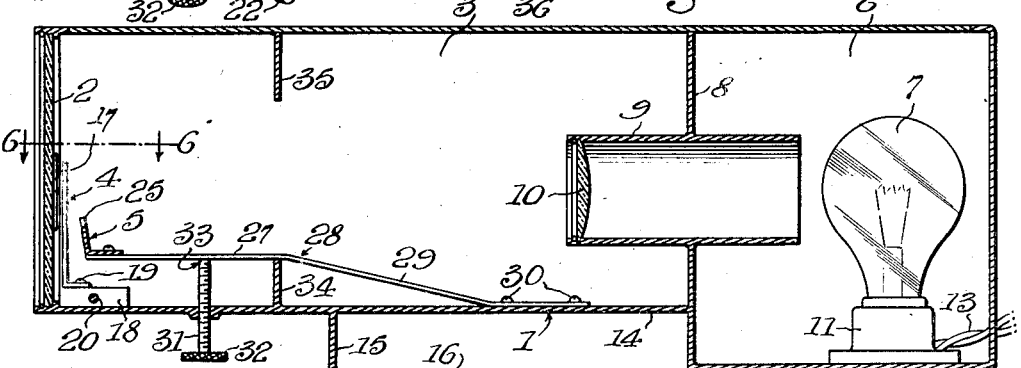
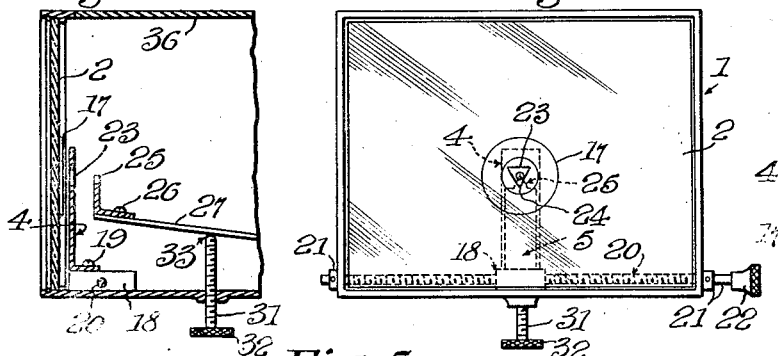
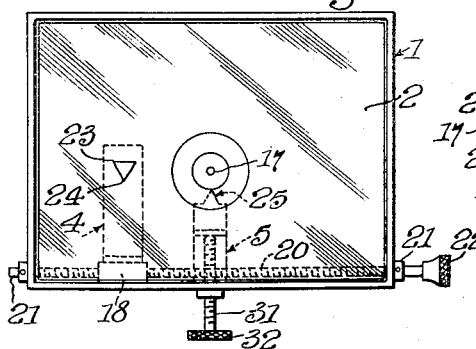
INVENTOR
Edward L. Black
BY
ATTORNEYS Patented May 25, 1943

2,319,787

UNITED STATES PATENT OFFICE 2,319,787

SIGHT TRAINING PICTURE DEVICE

Edward L. Black, United States Army,
Fort Benning, Ga.

Application June 1, 1942, Serial No. 455,372

10 Claims. (Cl. 35—25)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a sight training picture device; more particularly it is directed to a device of this character as a training aid in rifle and pistol marksmanship.

One of the objects of the invention is to provide a sight training picture device adapted to show the manner of properly alining the sights of a firearm in hitting a target.

Another object of the invention is to provide a sight training picture device including members having means formed thereon representing the fore and rear sights of a firearm, and means for bringing the fore and rear sights on the members into correct alinement with each other and with a bull's-eye.

Another object of the invention is to provide a sight training picture device for giving instruction in firearm practice, wherein shadow pictures or silhouettes of members shaped like the fore and rear sights respectively of a firearm are projected onto a translucent member having a bull's-eye thereon, with the fore and rear members being manually operated to coact with the bull's-eye in such a manner that an instructor may bring the front and rear sight members into alinement with the bull's-eye or change the positions thereof with respect to each other and with the bull's-eye as desired, to teach students how the sights on a firearm should be alined in hitting a target.

Another object of the invention is to provide a firearm sight training device which is efficient in use, cheap to construct, simple to operate, and which is not liable to become out of order.

Briefly stated, the improved sight training device comprises a casing including a housing containing a light source on the rear end thereof, and a translucent member having a bull's-eye thereon closing its front end. Members shaped like the front and rear sights of a firearm are adjustably mounted in the casing. By means of the light source and an optical tube, shadow pictures or silhouettes of the front and rear sight members are projected onto the translucent member, and by manually adjusting the front and rear sight members an instructor may bring them into correct alinement with respect to each other and with the bull's-eye or can change the respective positions thereof out of alinement with respect to each other and with the bull's-eye. Then the instructor may order a student to bring them into proper alinement whereby the student is taught how the sights on a firearm should be alined in hitting a target.

With the above and other objects and advantages in view, the invention consists of certain features of construction and operation of parts which will be hereinafter fully described and illustrated in the accompanying drawing, in which—

Fig. 1 is a perspective view of the improved sight training device;

Fig. 2 is an enlarged longitudinal sectional view thereof, partly in elevation, taken on the line 2—2 of Fig. 1, with a carriage for the front sight member in an inoperative position;

Fig. 3 is a fragmentary view of the front end portion of Fig. 2, with the carriage for the front sight silhouette in an operative position for alining the front sight member with the rear sight member and with the bull's-eye;

Fig. 4 is a front end view of the device showing shadow pictures of the front and rear sight members projected onto the translucent member, with the front and rear sight member adjusted into proper alinement with respect to each other and with the bull's-eye;

Fig. 5 is a similar view to Fig. 4, with the front and rear sight member adjusted out of alinement with respect to each other and with the bull's-eye;

Fig. 6 is a fragmentary transverse sectional view partly in elevation taken on the line 6—6 of Fig. 2;

Fig. 7 is a diagrammatic perspective view of the front and rear sight members in correct alinement with respect to each other and with the bull's-eye.

Referring more specifically to the drawing, the improved sight training picture device comprises a casing 1 closed at its front end by a translucent member 2 such as a frosted glass screen, and divided into a projection compartment 3 for two sight members 4 and 5, respectively, which are made of any suitable material such as metal or Celluloid, and a housing 6 for a light source 7 by means of a transverse partition 8 having a longitudinally extending optical tube 9 containing a convex lens 10 mounted therein. The light source 7, which may be of any suitable type, is illustrated as being in the form of an incandescent lamp mounted in a socket 11 provided on a base 12, which light source 7 is connected to a suitable source of electrical supply (not shown) by conductor 13. The base 12 of the light socket 11 extend below the lower wall 14 of the projection compartment 3, and a front supporting bracket 15 is provided on the lower wall 14 adjacent to the front end of the projection compartment 3 whereby the sight training picture device may seat on a table 16 or other suitable support.

A bull's-eye 17 is provided in any suitable manner on the translucent member 2, preferably fixed directly to the inner surface thereof, and the rear sight member 4 extends vertically upward adjacent to the inner surface of the translucent member, with the lower end of the member 4 being removably secured to a carriage 18 in the form of a block member by means of a screw 19 or the like. The carriage 18 is movably seated on the upper surface of the lower wall 14 within the front end of the projection compartment 3 and is screw-threadedly mounted on an adjusting screw 20 which extends transversely across the projection compartment 3, with the ends of the adjunsting screw 20 extending through the side walls of the projection compartment where they are rotatably held in position thereon by means of collars 21. A knurled hand-wheel 22 is mounted on one end of the adjusting screw 20 adjacent to a side wall of the casing 1.

The member 4 is shown as having a triangular shaped opening 23 formed therein intermediate of its length, providing a V-shaped cut-out portion 24 representing the back or rear sight of a firearm, but it will be readily understood that any other cut-out portion representing any type of sight may be used in carrying out the invention. The silhouette 5 is provided with an inverted V-shaped projection 25 on its upper end representing the front or fore sight of a firearm, with the lower end of the front sight member 5 being detachably secured by a screw 26 or the like to a horizontally extending front or free end portion 27 of a spring member or carriage 28 made of any suitable elastic material such as steel. The spring carriage 28 for the front sight member 5 has a portion 29 which extends rearwardly and downwardly where it is secured to the inner surface of the lower wall 14 of the projection compartment 3 by means of screws 30 or the like. In order to adjust the horizontally extending portion 27 of the spring carriage 28 in a vertical direction within the projection compartment 3 for moving the front sight 25 on the member 5 into and out of alinement with the rear sight 24 on the member 4 and with the bull's-eye 17, a vertically extending adjusting screw 31 having a hand-wheel 32 on its outer end is threadedly mounted in the lower wall 14 of the projection compartment 3, with the inner upper end 33 of the adjusting screw 31 contacting with the lower surface of the horizontally extending portion 27 of the spring carriage 28. The horizontally extending portion 27 of the spring carriage 28 may rest on the lower portion 34 of a baffle 35.

A cover 36 is suitably mounted on the top surface of the sight training picture device, whereby the front and rear sight members 4 and 5 may be removed for substituting other members having different sights thereon for different types of firearms, and for removing the lamp 7 should it become necessary to substitute another.

In operation, assuming that the sight training picture device has been set on a table or other suitable support 16 and that the front and rear sight members 4 and 5 have been moved out of alinement with respect to each other and with the bull's-eye 17, as more particularly illustrated in Figs. 2 and 5. Light rays from the lamp 7 are caused to enter the optical tube 9 and by using a convex lens 10, a beam of parallel rays of light is formed which is directed toward the front end of the device through the baffle 35 and shadow pictures or silhouettes of the front and rear sight members 4 and 5 are projected onto the translucent member 2, as more particularly illustrated in Figs. 4 and 5.

A student is then taken to the front of the device and an instructor may bring the rear and front sights 24 and 25 on the members 4 and 5, respectively, into correct alinement with respect to each other and with the bull's-eye 17, as illustrated in Fig. 4 in the following manner. The adjusting screw 20 is rotated by hand-wheel 22, whereby the block member 18 is actuated transversely of the projection compartment 3 until the rear sight 24 on the member 4 is in correct alinement with the bull's-eye 17. Then the adjusting screw 31 is screwed into the lower wall 14 of the projection compartment 3 by means of the hand-wheel 32, thus forcing the inner end 33 thereof up against the horizontally extending portion 27 of the carriage 28 against the spring action thereof, whereby the member 5 having the front sight 25 thereon is caused to move vertically upward. The adjusting screw 31 is actuated until the front sight 25 on the member 5 is in correct alinement with the rear sight 24 on the member 4 and with the bull's-eye 17, whereby the student or recruit may be shown how the bulls-eye 17 should appear when seen through correctly alined front and rear sights.

The instructor then rotates the adjusting screw 20, which in turn causes the block member 18 to slide on the lower wall 14 transversely of the projection compartment 3 for moving the rear sight member 4 out of alinement with the front sight member 5 and with the bull's-eye 17. The adjusting screw 31 is then partially unscrewed from the lower wall 14, whereby the horizontally extending portion 27 of the spring carriage 28 is caused to move downwardly by spring action, moving the front sight 25 on the member 5 out of alinement with the bull's-eye 17. The adjusting screw 31 may be unscrewed sufficiently from the lower wall 14 of the projection compartment 3 until the horizontally extending portion 27 of the spring carriage 28 seats on the lower portion 34 of the baffle 35. The instructor then orders the student to bring the front and rear sights 25 and 26 on the members 4 and 5, respectively, into correct alinement with respect to each other and the bull's-eye 17, which the student can quickly accomplish, thereby teaching the student how the sights on a firearm should be alined in hitting a target.

By removably mounting the front and rear sight members 4 and 5 on the block member 18 and the spring carriage 28, respectively, other members having different sights for other types of firearms may be substituted therefor.

It will thus be seen that there is herein provided a novel and efficient form of firearm sight training picture device which is well adapted for the purpose intended. Even though there has been herein shown and described certain features of construction and operation of parts, it is nevertheless to be understood that various changes may be made therein if the changes do not depart from the spirit or scope of the claims.

Having described my invention, what I claim as new and wish to secure by Letters Patent is:

1. A sight training picture device comprising in combination a casing, a translucent member closing one end of said casing, a bull's-eye provided on said translucent member, a plurality of supporting means adjustably mounted on said casing, a front sight member carried by one of said supporting means and a rear sight member carried by another of said supporting means, means adapted to project shadow pictures of said front and rear sight members onto the translucent member, separate means for actuating each of said supporting means for moving said front and rear sight members into and out of alinement with each other and with said bull's-eye.

2. A sight training picture device comprising in combination a casing including a translucent member closing a portion of said casing, a bull's-eye provided on said translucent member, a rear sight member mounted to move transversely of said casing and a front sight member mounted to be actuated vertically on said casing, means adapted to project shadow pictures of said front and rear sight members onto the translucent member, and means for actuating said front and rear sight members into and out of alinement with each other and with said bull's-eye.

3. A sight training picture device comprising in combination a casing including a translucent member closing a portion of said casing, a bull's-eye provided on said translucent member, supporting means adjustably mounted on said casing, front and rear sight members carried by said supporting means, means including a light source adapted to project shadow pictures of said front and rear sight members onto said translucent member, and means for actuating said supporting means for moving said front and rear sight members into and out of alinement with each other and with said bull's-eye.

4. A sight training picture device comprising in combination a casing including a translucent member closing a portion of said casing, a bull's-eye provided on said translucent member, a plurality of supporting means adjustably mounted in said casing to the rear of said translucent member, a front sight member carried by one of said supporting means and a rear sight member carried by another of said supporting means, a light source mounted in the rear of said front and rear sight members and said translucent member, an optical tube adapted to project light rays from said light source toward said translucent member whereby shadow pictures of said front and rear sight members are projected onto said translucent member, and means for actuating said supporting means for moving said front and rear sight members into and out of alinement with each other and with said bull's-eye.

5. A sight training picture device comprising in combination a casing, a translucent member closing one end of said casing, a bull's-eye provided on said translucent member, a plurality of supporting means adjustably mounted on said casing, a front sight member removably mounted on one of said supporting means and a rear sight member removably mounted on another of said supporting means, and means for actuating each of said supporting means for moving said front and rear sight members into and out of alinement with each other and with said bull's-eye.

6. In a sight training picture device comprising a casing including a translucent member, a bull's-eye provided on said translucent member, a carriage mounted to move transversely of said casing, a rear sight member mounted on said carriage, an elastic carriage including a portion having a front sight member thereon, said portion of said elastic carriage adapted to be actuated vertically on said casing, means including a light source adapted to project light rays toward said translucent member whereby a shadow picture of the front and rear sight members is projected onto said translucent member, means for actuating said first-mentioned carriage for moving said rear sight member into and out of alinement with said bull's-eye, and means operable in one direction for actuating said portion against the elasticity of said second-mentioned carriage to move said front sight member into alinement with said rear sight member and said bull's-eye, said portion of said elastic carriage adapted to return to its original position upon the operation of said last-mentioned means in another direction whereby the front sight member may be moved out of alinement with the rear sight member and bull's-eye.

7. In a firearm sight training picture device comprising a casing closed at its front end by a translucent member, a bull's-eye provided on said translucent member, a transversely extending adjusting screw rotatably mounted on said casing, a block member threadedly mounted on said adjusting screw, a rear sight member removably mounted on said block member, means for actuating said adjusting screw for actuating the block member transversely of the casing for moving the rear sight member into and out of alinement with the bull's-eye, a spring carriage having ends, one of the ends of the spring carriage secured to the casing, a rear sight member removably mounted on the free end of said spring carriage, an adjusting screw threadedly mounted on the casing and adapted to actuate the free end of said spring carriage in an upward or downward direction for moving said front sight member into and out of alinement with the rear sight member and with the bull's-eye, a light source mounted in the rear end of said casing, an optical tube mounted on said casing adjacent to said light source and adapted to direct parallel rays of light from said light source toward said translucent member for producing shadow pictures of said front and rear sight members on said translucent member whereby students may be taught the correct manner of properly alining the front and rear sights of a firearm on an object.

8. A sight training device comprising, in combination, a casing including a projection compartment and a light housing, a light source in said housing, a translucent member closing an end of the projection compartment and having a bull's-eye provided thereon, front and rear sight members adjustably mounted in the projection compartment of said casing, means for projecting a beam of light from said light source through said projection compartment onto said translucent member whereby shadow pictures of the front and rear sight members are projected onto the translucent member, and means for adjusting the front and rear sight members into and out of alinement with each other and with the bull's-eye on the translucent member.

9. A sight training device comprising, in combination, a casing including a projection compartment and a light housing, a light source in said housing, a translucent member closing an end of the projection compartment and having a bull's-eye provided thereon, front and rear sight members adjustably mounted in the projection compartment of said casing, said rear sight member adjustably mounted to move transversely of said casing within the projection compartment and said front sight member adjustably mounted to move vertically in the projection compartment, means for projecting a beam of light from said light source through said projection compartment onto the translucent member, whereby shadow pictures of the front and rear sight members are projected onto the translucent member, and means for adjusting the front and rear sight members into and out of alinement with each other and with the bull's-eye on the translucent member.

10. A sight training device comprising, in combination, a casing including a projection compartment and a light housing, a light source in said housing, a translucent member closing an end of the projection compartment, carriages adjustably mounted in the projection compartment of said casing, one of said carriages adjustably mounted to move transversely in said projection compartment and having a rear sight member mounted thereon and another of said carriages including a portion adjustably mounted to be moved vertically in said projection compartment, a front sight member mounted on said portion of said last-mentioned carriage, means for projecting a beam of light from the light source through said projection compartment onto said translucent member whereby shadow pictures of the front and rear sight members are projected onto the translucent member, and means for actuating said carriages to adjust said rear and front sight members into and out of alinement with each other and with the bull's-eye on the translucent member.

EDWARD L. BLACK.